May 14, 1929.  F. H. NICKLE  1,712,838
SORTING MACHINE
Filed Sept. 30, 1925  2 Sheets-Sheet 1

INVENTOR
Frank H Nickle

May 14, 1929.  F. H. NICKLE  1,712,838
SORTING MACHINE
Filed Sept. 30, 1925   2 Sheets-Sheet 2

INVENTOR
Frank H. Nickle

Patented May 14, 1929.

1,712,838

UNITED STATES PATENT OFFICE.

FRANK H. NICKLE, OF SAGINAW, MICHIGAN.

SORTING MACHINE.

Application filed September 30, 1925. Serial No. 59,461.

This invention relates to machines for sorting or classifying globular particles of materials, seeds, etc. and especially for separating the culls, dirt, etc. from beans. It relates particularly to machines of the type indicated in which the beans are fed upon sorting rolls which pass the culls but do not pass the choice beans.

In the conventional bean picker, sorting rolls of rubber are used and are inclined, so that when beans are fed to the trough of the rolls at the upper end thereof the culls pass between the rolls, but the good beans will travel downward due to the action of gravity. The inclination of the rolls largely determines the quality of the picking and likewise the capacity of the machine. Should the inclination be too great, the efficiency of the picking is greatly impaired, because the beans acquire so great a speed that they tend to bound or vibrate from side to side in the trough of the rolls. In this manner a large percentage of the defective beans may travel the entire length of the rolls without making simultaneous contact with the moving surfaces of both rolls so as to be caught and drawn thru. If the inclination of the sorting rolls is reduced so that they are nearly level, the quality of the picking will be materially improved, but the capacity will be curtailed to such an extend that the operation of the machine may not prove profitable.

The present invention has among its objects to overcome the difficulties just mentioned and to operate the rolls at their greatest efficiency in sorting without materially decreasing their capacity.

Another object is the feeding of the beans to the rolls in single file and so as not to cause them to rebound from the surface thereof.

Another object is to cause the beans to rotate in contact with the sorting rolls in such fashion as to present thereto every portion of their surfaces so that a bean having only a small spot will be thrown out as a cull.

Still another object is the elimination, before the actual sorting, of grit, small fragments and the like.

With these and other objects in view as will more celarly appear from the following description, the invention consists broadly in a device of the kind indicated in which the rolls operate in a horizontal position upon the beans fed singly thereto and the latter are caused to move along the rolls, the culls being passed between the rolls while the select beans travel to the ends thereof.

Figure 1:
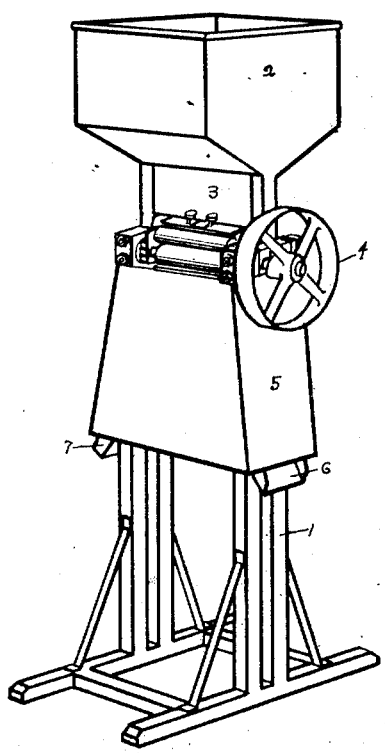
Figure 2:
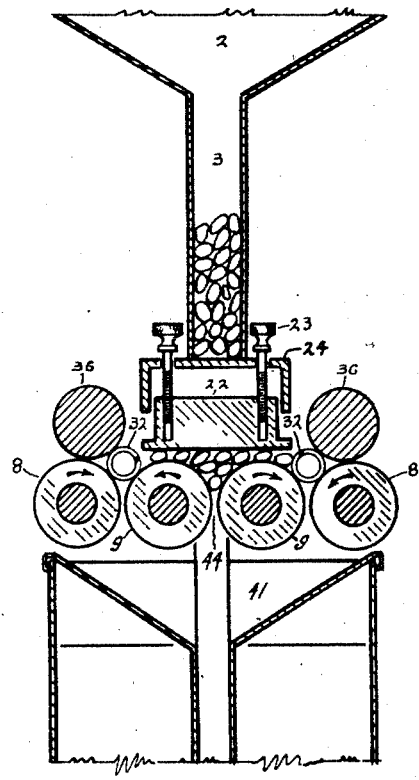
Figure 3:
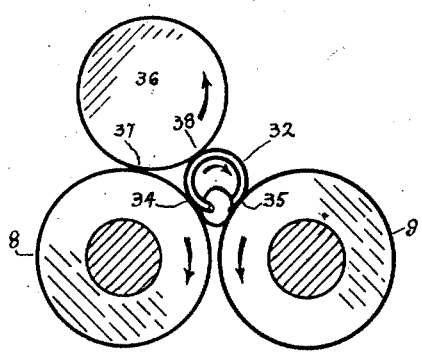
Figure 4:
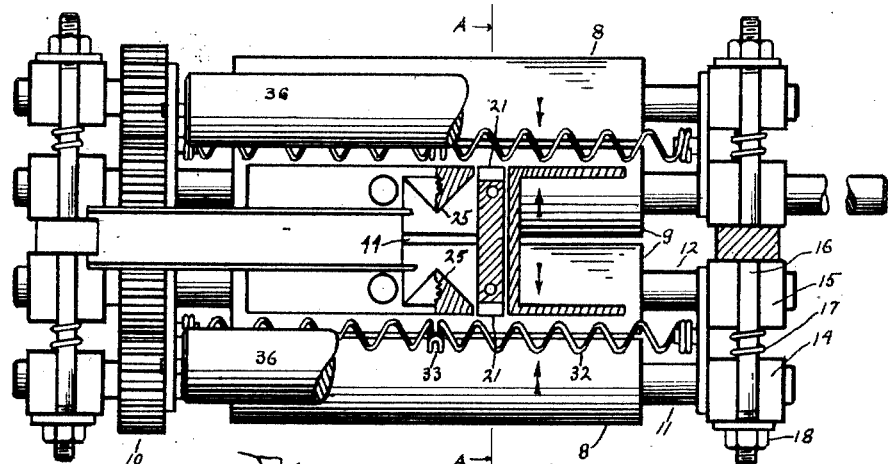
Figure 5:
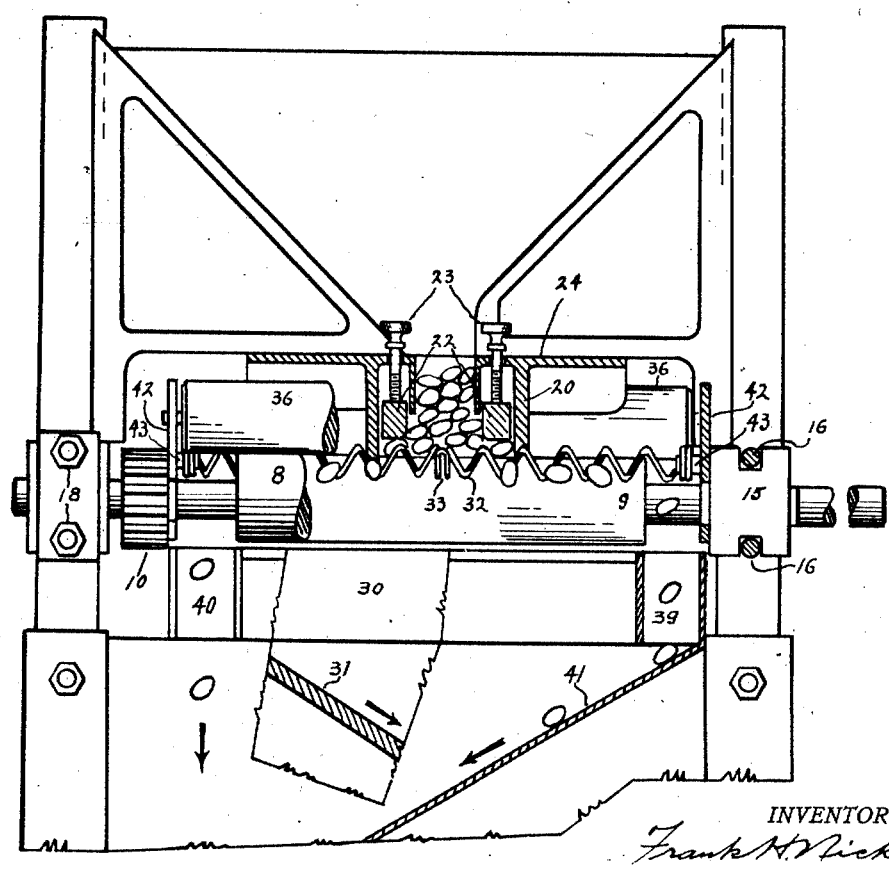

Reference is made to the accompanying drawings in which: Fig. 1 is a perspective view of a bean-sorting machine embodying the invention. Fig. 2 is a cross-sectional elevation thru the rolls and feeding mechanism on the line A—A of Fig. 4. Fig. 3 is an enlarged diagrammatic view of a set of rolls corresponding to Fig. 2. Fig. 4 is a fragmentary plan view of the rolls and feeding mechanism with the hopper removed. Fig. 5 is a fragmentary side elevation showing parts of the feed mechanism in section.

Referring to Fig. 1 of the drawings, 1 is a frame which supports a hopper 2 adapted to receive beans or other objects to be sorted. To the bottom of the hopper is attached a chute 3 which delivers the beans thru a suitable feeding mechanism to sorting rolls, the details of which are hereinafter fully set forth. When power is applied to the pulley 4, the rolls effect a separation of the defective and the choice beans which descend by gravity thru independent passageways surrounded by the jacket 5 which has outlet spouts 6 and 7 respectively for culls and choice beans.

Referring to Figs. 2, 4 and 5, the two outside rolls 8 and the two inside rolls 9 form two pairs of sorting rolls which are made coacting by means of the spur gears 10, the direction of rotation being as indicated by the arrows. The outside and inside rolls are mounted on spindles 11 and 12 respectively which are likewise journaled in bearings 14 and 15. The bearings are supported by means of studs 16 which project from the frame. Resilient means, such as compression springs 17, hold the outside and inside bearings any desired distance apart when the nuts 18 are adjusted.

Centrally located over the two inside rolls is a reservoir or feed box 20 which receives beans from the chute. This feed box is supported independently of the rolls, the lower marginal edges of the vertical walls being made to conform closely to the contour of the rolls so as to form a bean-tight compartment with two pairs of opposed feed openings 21 thru which the beans are delivered to the sorting rolls. There being no bottom in the feed box, the beans descend directly upon the rapidly moving surfaces of the inside rolls, and to the beans in intimate contact therewith there is imparted a lively agitation or rolling-over movement which tends to sweep them forward in opposite directions out through the feed openings. To control the tendency of the beans to flood thru the feed openings, it is found necessary to provide compensating gauges 22 which function as valves automatically opening and closing to permit the beans to flow single file regardless of the size or shape. These gauges are loosely suspended within the confines of the feed box at right angles to the rolls by means of the thumb screws 23, which protrude up thru loosely fitting holes in the cover portion 24 of the feed box. The ends of the gauges enter the opposed feed openings so that no beans can pass thru into the trough of the sorting rolls without passing between the under side of one end of the gauge and the adjacent roll. The side walls of the feed box are provided with V-shaped tongues 25 which, in co-operation with the rapidly moving rolls, tend to force or crowd the beans underneath the compensating gauges. When a bean is caught between the roll and the underside of one of the gauges, the weight of the gauge presses the bean down upon the rapidly moving surface of the roll, thereby imparting a forward rolling movement which quickly carries the bean out the feed opening. As the size and shape of the beans varies considerably, the gauges must be fitted to raise up and down freely in order to maintain a uniform pressure upon the beans rolling under them. In this manner the beans are fed one at a time thru the feed openings, the flow being steady and the peripheral velocity of the beans approaching that of the rapidly moving surface of the roll in contact therewith.

After the beans reach the trough of the sorting rolls, the split, flat, rough, soft and undersize beans are quickly caught and drawn thru the rolls from which they gravitate to the passageway 30 having an inclined bottom 31 leading to the spout 6.

The choice beans, which resist the gripping action of the sorting rolls, are conveyed longitudinally in the trough of the rolls in opposite directions by means of a combined right and left hand wire helix 32 having the neutral point 33 midway between the feed openings. Referring to Fig. 3, it will be seen that the wire helix is seated in the trough of the rolls so that it makes contact with the outside roll 8 at point 34 and the inside roll 9 at point 35. With the rolls rotating in opposite directions as indicated by the arrows, the helix will not rotate unless means is provided to counteract the negative friction due to one of the rolls. By means of a novel mechanical movement, the wire helix is made to rotate in a positive manner and in a predetermined direction, the driving force being derived from the auxiliary friction roll 36, which is mounted so as to be jointly supported by the outside sorting roll 8 and the wire helix, the points of rolling contact being 37 and 38 respectively. When so supported, the clockwise rotation of the outside roll will cause the auxiliary roll to be driven counterclockwise and in turn will tend to drive the wire helix in a clockwise direction. The helix will rotate freely because it is under the influence of two positive rolling contacts which more than counterbalances the retarding effect of frictional contact with the outside roll.

The pitch of the wire helices should be great enough to allow a bean to lie lengthwise in the trough of the sorting rolls, and to permit the bean to roll end over end as it is conveyed forward by helicoidal action. This rolling-over movement is very essential, as it materially improves the efficiency of the picking, because all sides of the bean are brought in intimate contact with the gripping surfaces of the sorting rolls. After traveling in this manner to the end of the rolls, the beans drop down the passageways 39 and 40 to the inclined plate 41 leading to the outlet 7 for choice beans.

At the ends of each pair of sorting rolls is a vertical plate 42 from which projects a horizontal pin 43 which enters the end of the wire helix a short distance so as to hold the helix in operative position in the trough of the rolls so it will not jump out of place in case it encounters a stone or other foreign matter larger than beans.

Referring to Fig. 2, it will be seen that the inside sorting rolls 9 and 9 are spaced apart to provide sufficient clearance 44 (see Fig. 2) to permit undersized beans, split beans, small lumps of dirt and fine grit to drop down into the passageway 30 and out with the culls. This provides an effective way of grading and cleaning the beans to eliminate beans or particles that are smaller than normal beans.

In the foregoing, reference is had to the conventional rubber-covered bean sorting rolls. In this invention, is has been found that the combination of a metal roll with a rubber-covered roll, to form a pair of sorting rolls, is desirable. If the metal roll is placed on the outside, or underneath the auxiliary friction roll, it greatly increases the driving power of the wire helix, because the retarding effect of the outside roll is materially reduced, the coefficient of friction of a smooth metal roll being much less than that of a rubber roll. This arrangement of a metal roll in conjunction with a rubber roll also provides a means for rotating the beans about their major axis as they lie in the trough of the sorting rolls, the direction of rotation being concurrent with that of the wire helix. This improves the quality of the sorting, because a small defective spot on a bean is more surely brought in intimate contact with the gripping surfaces of the rolls. Another advantage is the fact that the rolls may be operated with considerably more gap or clearance between the gripping surfaces without permitting an excess of choice beans to pass thru the rolls with the culls. This improves the selectivity of the rolls, particularly so when operating on beans that are slightly damp or soft.

Having now described the invention and the preferred form of embodiment thereof, it is to be understood that the said invention it not to be limited to the specific details herein set forth but only by the scope of the claims which follow.

Claims:

1. In a bean sorting machine, a pair of sorting rolls, a feed box mounted above the rolls and independent thereof, with its lower end open to one of the rolls whereby said rolls serve to feed beans from said box, an outlet in the feed box adapted to permit beans to flow to the trough of the sorting rolls, and means for causing the beans to flow through the outlet one at a time regardless of size and shape.

2. In a bean sorting machine, a pair of sorting rolls, a feed box mounted above the rolls and independent thereof, with its lower end open to one of the rolls, an outlet in the feed box adapted to permit beans to flow to the trough of the sorting rolls, and means for controlling the flow of beans thru the outlet, the said means consisting of a compensating gauge mounted at right angles to the rolls and adapted to roll the beans thru the said feed opening one at a time by pressing the beans down upon the moving surface of the roll.

3. In a bean sorting machine, a pair of sorting rolls, means for supplying beans to the rolls, a helicoidal conveyor seated in the trough of the rolls and adapted to convey beans fed thereto lengthwise of the rolls and means for rotating the conveyor, the said means consisting of an auxiliary friction roll mounted so as to make simultaneous rolling contact with one of the said rolls and the said conveyor.

4. In a bean sorting machine, a pair of smooth sorting rolls at least one of which is provided with a yielding surface, means for feeding a stream of beans to the rolls, and, means for conveying the beans longitudinally in the trough of the said rolls.

5. In a bean sorting machine, a pair of revoluble sorting rolls, means for feeding a stream of beans to the trough of the rolls and means to cause the beans fed to the said rolls to travel longitudinally thereof by rolling end over end, the said means consisting of a wire helix in the trough of the rolls and adapted to be rotated by the action of one of the said rolls.

6. In a bean sorting machine, a pair of revoluble sorting rolls, a helical conveyor in the trough of the rolls and adapted to be rotated thereby, and an idler roll resting upon one of said rolls and said conveyor.

7. In a bean sorting machine, a pair of revoluble sorting rolls, one of which is provided with a metal roll surface, a helical conveyor lying in the trough of said rolls, and an idler roll resting upon said conveyor and said metal roll, whereby said conveyor becomes rotated in a direction opposed to the rotation of the other of the pair.

8. In combination, a pair of revoluble rolls, a helicoidal conveyor seated in the trough formed by the rolls, and means adapted to rotate the helix in a predetermined direction, said means consisting of an auxiliary friction roll mounted so as to make simultaneous rolling contact with the conveyor and one of said rolls.

9. In combination, a metal roll and a rubber covered roll adapted to form a pair of sorting rolls, means to drive the rolls in opposite directions, a wire helix seated in the trough of the rolls, and means co-operating with one of the said rolls to cause the wire helix to revolve in a positive manner.

10. In a bean sorting machine, a metal roll operating in conjunction with a rubber covered roll to form a pair of bean sorting rolls having different coefficients of friction, a hopper, means to supply beans to the hopper, means for feeding the beans from the hopper to the trough of the sorting rolls, revoluble helicoidal means seated in the trough of the rolls and adapted to convey the beans longitudinally thereof, said devices co-acting to cause each bean to roll end over end and simultaneously rotate about its major axis.

FRANK H. NICKLE.